Dec. 4, 1934.  L. L. KAESS  1,983,230
RADIO DIRECTION FINDER
Filed July 1, 1929  3 Sheets-Sheet 1

INVENTOR
BY
ATTORNEY

Dec. 4, 1934.   L. L. KAESS   1,983,230
RADIO DIRECTION FINDER
Filed July 1, 1929   3 Sheets-Sheet 2

Dec. 4, 1934.   L. L. KAESS   1,983,230
RADIO DIRECTION FINDER
Filed July 1, 1929   3 Sheets-Sheet 3

INVENTOR
BY
ATTORNEY

Patented Dec. 4, 1934

1,983,230

UNITED STATES PATENT OFFICE 1,983,230

RADIO DIRECTION FINDER

Louis L. Kaess, New York, N. Y.

Application July 1, 1929, Serial No. 375,074

11 Claims. (Cl. 250—11)

The object of this invention is to provide a radio direction finder which shall not only enable a mariner or an aeronaut to obtain information from any radio broadcasting station but to constantly have available information of the deviation of his craft's compass, regardless of his course or of variations in his course.

The improvement consists in combinations of parts set forth in the following description and illustrated in the accompanying drawings.

In the accompanying drawings.

Similar letters of reference designate corresponding parts in all these figures.

Figure 1:
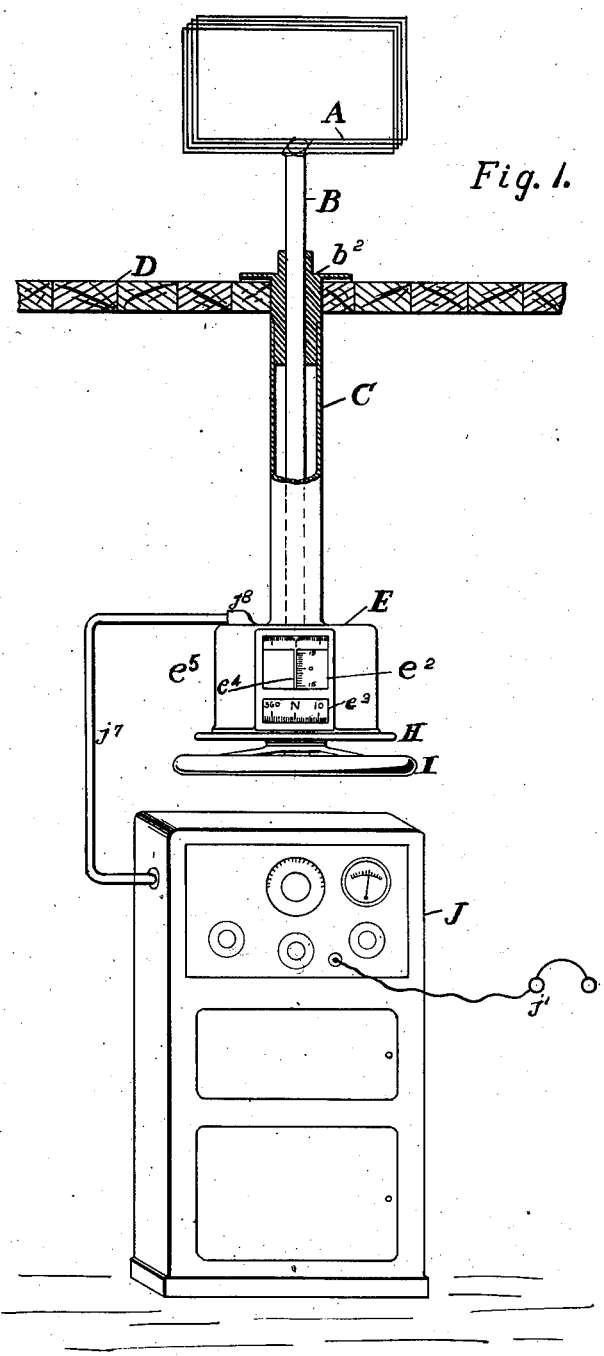
Fig. 1 is a front elevation of an instrument embodying the improvements.
Figure 2:
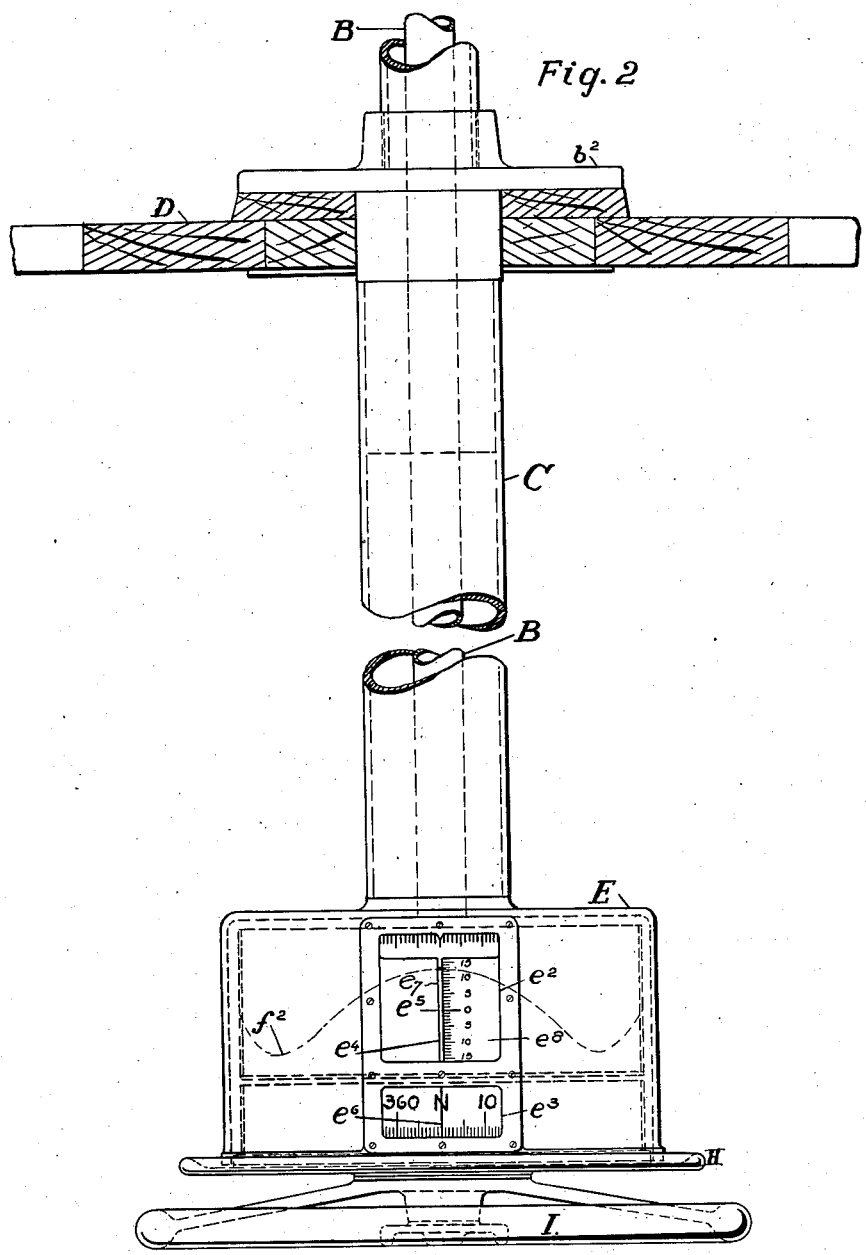
Fig. 2 is a front elevation upon a larger scale of a portion of the same.
Figure 4:
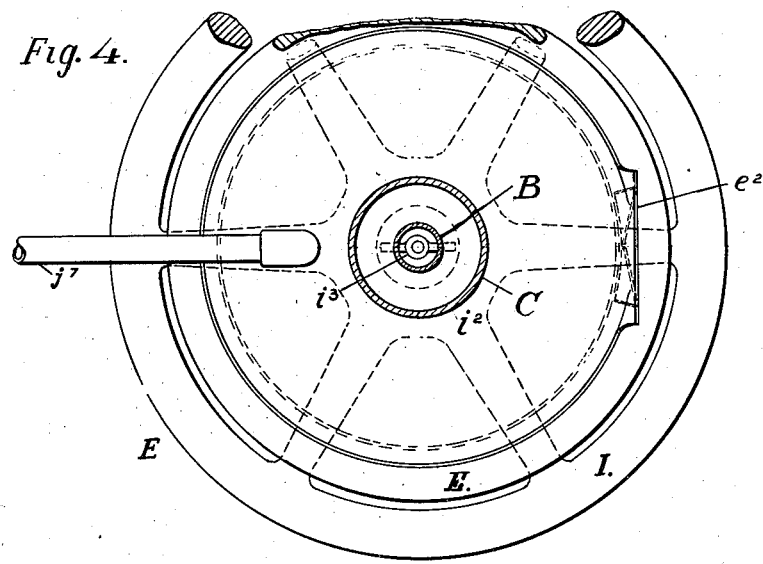
Fig. 4 is a horizontal section taken at the plane of the dotted line marked 4—4 in Fig. 3.
Figure 3:
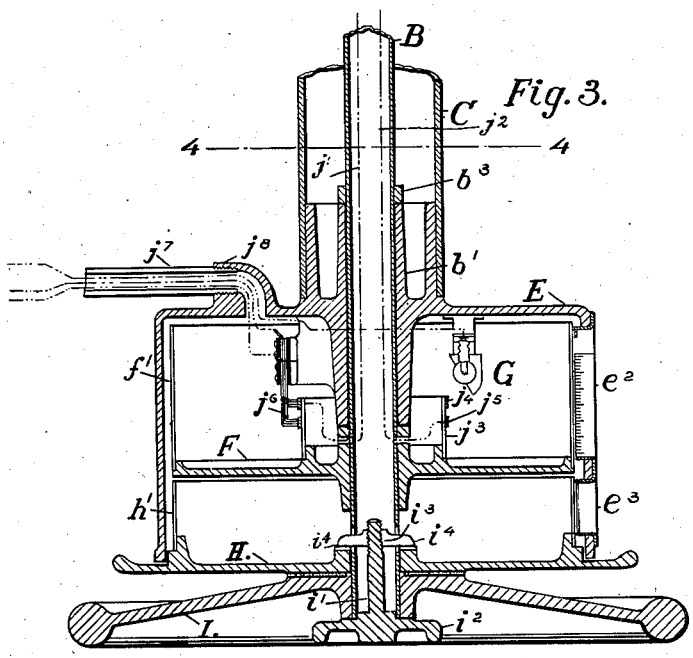
Fig. 3 is a central vertical section of a portion of the same.

A is a loop antenna connected to a tubular shaft B which at its lower portion is supported in a bearing $b^1$ forming a central and upward extending portion of a casing E. The upper portion of the shaft B is supported in a bearing $b^2$. Affixed to the shaft B above $b^1$ is a ring $b^3$ forming a shoulder which projects above the bearing $b^1$ and thus supports the shaft B vertically.

The bearing $b^2$ has a flange-like portion extending above a support D, which may be the roof of a cabin on an aerial or marine vessel, and a depending portion which passes through support D. Below the support D it has immovably affixed to its exterior a tubular housing C. The lower portion of this housing C has the bearing $b^1$ immovably affixed to it. The casing E is of cylindrical shape and constitutes a screen for inner parts later to be described. The casing E is provided with two apertures, $e^2$, $e^3$ one above the other. Within the upper aperture $e^2$ is placed a non-transparent card $e^8$ marked with a vertical line $e^4$ which corresponds with the plumb line of the vessel on which the instrument is used, and it is also marked with a horizontal line $e^5$. Along the vertical line $e^4$ is provided a scale marked in degrees the zero of this scale being opposite the horizontal line $e^5$ and the scale extending both above and below this line for the card of aperture $e^4$ is provided along the vertical line $e^4$ with a narrow vertical slot $e^7$.

Opposite the window $e^2$ is located a graph-holder F consisting of a plate affixed to the lower portion of the shaft B so as to turn therewith, and provided with a peripheral shoulder into which may be fitted a graph $f^1$ provided with a sinuous line $f^2$. The sinuous line $f^2$ corresponds to the deviations caused by local magnetic influences due mainly to the metal parts of the craft. To determine the direction of a transmitting station of which the signal has been picked up, the loop antenna is rotated and the signal strengths observed; when the minimum signal is observed, the direction perpendicular to the plane of the loop antenna is supposed to give the direction of the transmitting station. However, due to the magnetic influences above referred to there will be in the rule a deviation of several degrees between the direction so obtained, and hereafter referred to as apparent direction, and between the true direction of the transmitting station; these deviations being solely caused by local influences on the craft can be determined once for all for any craft by taking signals from a transmitter of known direction and turning the ship around a complete circle determining for every angle the deviation between the true and apparent direction. This deviation expressed in degrees is then drawn on the graph $f^1$ giving the curve $f^2$ a sinuous character. The graph is so secured to the antenna shaft B, that that portion of the sinuous curve appears before the slot $e^7$ which gives the deviation for the corresponding antenna position. When the graph $f^1$ is carried by the graph-holder F past the aperture $e^2$ its sinuous line $f^2$ will be visible through the slot $e^7$ of the card $e^8$ and the scale which is marked along the vertical line $e^4$ will indicate the angle of deflection which the mariner must take into consideration in depending upon the indication of the direction finder.

Preferably the graph $f^1$ will be made of translucent material so that it may be illuminated by an electric lamp G inside it. If made of opaque material the lamp, of course, will have to be outside it.

Loosely mounted on the shaft B near the lower end of the latter is a plate H carrying a cylindrical card $h^1$ located opposite the aperture $e^3$ and being on its periphery provided with a scale divided in angular degrees. The aperture $e^3$ is fitted with glass or celluloid—provided with a vertical line $e^6$ corresponding to the plumb line of the craft.

It will be seen that the carrier H extends beyond the exterior of the casing E so that it may be reached to adjust it circumferentially with the card $h^1$ into different positions relatively to the shaft B to make it possible to take observations not only in direction of the plumb line of the craft but also off-bow observations at any angle to the plumb line.

Below the carrier H a wheel-shaped handle I is fixedly secured to the shaft B so that the turning of this handle will cause all the parts attached to it to turn. The carrier H is vertically supported by this handle I and may be clamped to turn with it. A means whereby the clamping may be done consists of a screw $i^1$ provided with a handle $i^2$ below the handle I and engaging with a nut $i^3$ having arms $i^4$ which extend through vertical slots in the shaft B. Obviously by turning the screw in one direction the carrier H will be clamped to the handle I thereby connecting the antenna with the card $h^1$, and by turning it in the other direction it may be unclamped, thus disconnecting the antenna from the card $h^1$.

With the antenna A is electrically connected a radio receiver J which may be any suitable form and provided with the usual adjusting devices and some signaling devices, such for instance as a head-phone $j^1$.

Wires $j^2$ extend from the antenna coil A through the tubular shaft B and pass out through holes with which said shaft is provided to a cylinder of insulating material such as bakelite $j^3$ which is affixed to the graph-holder F to turn with it. On the exterior of this cylinder $j^3$ are metal rings $j^4$, $j^5$ with which the said wires are connected. Brushes $j^6$ supported by the screen E contact with the rings $j^4$ $j^5$ and wires from these brushes extend out through a pipe $j^7$ which is secured in a socket $j^8$ with which the screen E is provided. The wires of the lighting circuit also extend out through the pipe $j^7$. From the above it will appear that my direction finding device is adapted to be used independently of the ship's compass and permits determination of the true direction of the transmitting station from which the signal is observed whereby correction for local disturbing influences can be conveniently obtained by adding or subtracting the deviations indicated by curve $f^2$ opposite the scale $e^4$. It is also apparent that my device being independent of the craft's compass, the known deviations and unknown errors of the compass are eliminated and in fact my device can be used for the correction of such deviations and errors. Furthermore, as the antenna can be detached from and rotated independently of card $h^1$ my device is not limited to the observation of directions falling in the plumb line of the craft but also off-bow observations under any desired angle may be conveniently taken.

What is claimed and sought to be secured by Letters Patents:

1. In a radio direction finder having a rotatable antenna; an index pointer; means for indicating the relative position of said antenna with respect to said index pointer whereby the apparent direction of a transmitting station is determined; a cylindrical graph provided with a correction line and having a connection with said antenna whereby said graph is rotatable with said antenna; a scale in operative relation with said correction line adjacent said index pointer, said line representing on said scale the variations between the apparent direction indicated by said first mentioned means and the true direction of the transmitting station.

2. In a radio direction finder for crafts having a rotatable directional antenna; a stationary pointer; a rotatable scale means for providing a driving connection between said scale and said directional antenna and movable past said pointer to indicate the angle which the antenna forms with the keel line of the craft; and means for disconnecting said driving connection means whereby said scale is movable with respect to said directional antenna whereby the scale indicates the angle which the antenna makes with any other line of reference than the keel line of the craft.

3. In a radio direction finder for crafts having a rotatable antenna; a housing; a graph having a connection with said antenna and rotatable therewith within said housing, said graph comprising a curve indicating the radiant energy deviations caused by local influences on the craft for every position of the antenna; an aperture in said housing for bringing into visibility only the portion of said curve corresponding to the angular position of said antenna; and a scale cooperating with said visible portion for indicating said deviation at each angular position of said antenna.

4. In a radio direction finder for crafts having a rotatable antenna; a circular correction card connected therewith; the axis of said card being in a vertical plane, said card having a rotatable connection with said antenna; a scale cooperating with said card, said card for each angular position of said antenna indicating on said scale the angular deviations of received radiant energy caused by local influences; a scale having a connection and rotatable with said antenna for indicating the angular position of said antenna with respect to a predetermined line of reference, said card and said scale being located adjacent each other; and means whereby only that portion of said scale and card from which the reading is to be taken are brought into visibility at any one time.

5. In a radio compass a rotatable antenna; bearing indicating means comprising a stationary pointer; a scale rotatable with said antenna and movable past said stationary pointer for indicating the angular position of said antenna; and means for indicating a correction to be applied to every scale reading at each angular position of said antenna comprising a rotatable graph having a predetermined construction in accordance with wave front distortion existing at each angular position, said graph being connected to and rotatable with said scale.

6. In a radio compass; bearing indicating means comprising a stationary pointer; a rotatable scale movable past said stationary pointer; means for indicating corrections to be applied to every reading of said scale comprising a graph and a cooperating scale therefor; means whereby said graph is rotatable with said first mentioned scale; and means for shifting the angular position of said rotatable scale with respect to said graph.

7. In a radio compass; bearing indicating means comprising a stationary pointer; a rotatable scale movable past said stationary pointer; means for indicating corrections to be applied to said scale readings comprising a fixed indicator and a graph constructed in accordance with wave front distortion, movable past said indicator; means for shifting the angular position of said scale with respect to said graph; and a housing enclosing said graph and said scale.

8. In a radio compass; bearing indicating means comprising a stationary pointer; a rotatable scale movable past said stationary pointer; means for indicating corrections to be applied to the reading of said scale comprising a fixed scale and rotatable graph; means for shifting the angular position of said scale with respect to said graph; and a housing for said scale having a window exposing to view at all times only that portion of said scale and said graph from which a reading is to be taken.

9. In a radio compass having a directional antenna movable over an angular range; a fixed pointer; an antenna position indicator having a scale having a connection to and movable with said antenna past said fixed pointer for indicating thereon the angular position of said antenna; and a wave front correction indicator comprising a scale, and indicating means having a motion transmitting connection with said directional antenna to indicate for each indication of the antenna position indicator, the angular correction necessary to the indicator reading to compensate for wave front distortion.

10. In a radio compass having a directional antenna movable over an angular range; a stationary pointer; a scale having a connection to, and rotatable with said antenna past said pointer for indicating thereon the angular position of said antenna; and a wave front correction indicator including means controlled by said antenna for variably indicating the correction to be applied to said first mentioned scale indication for each angular position of said antenna.

11. In a radio compass having a directional antenna movable over an angular range; a stationary pointer; a scale having a connection to, and rotatable with said antenna past said pointer for indicating thereon the angular position of said antenna; and a wave front correction indicator adjacent said stationary pointer including means controlled by said antenna for variably indicating, at a position adjacent said stationary pointer, the correction to be applied to said first mentioned scale indication in accordance with the angular position of said antenna.

LOUIS L. KAESS.